No. 817,150. PATENTED APR. 10, 1906.
L. E. ALLEN.
HARROW TOOTH FASTENER.
APPLICATION FILED APR. 15, 1905.
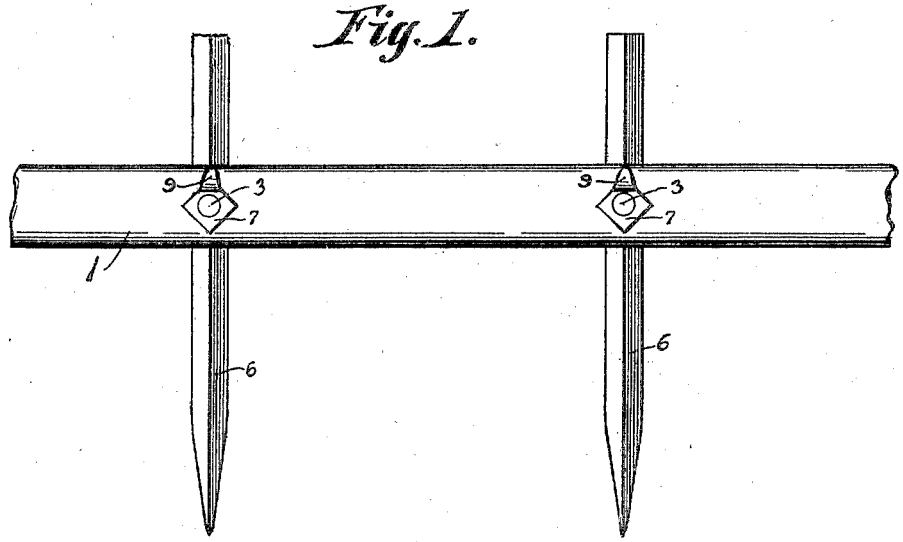
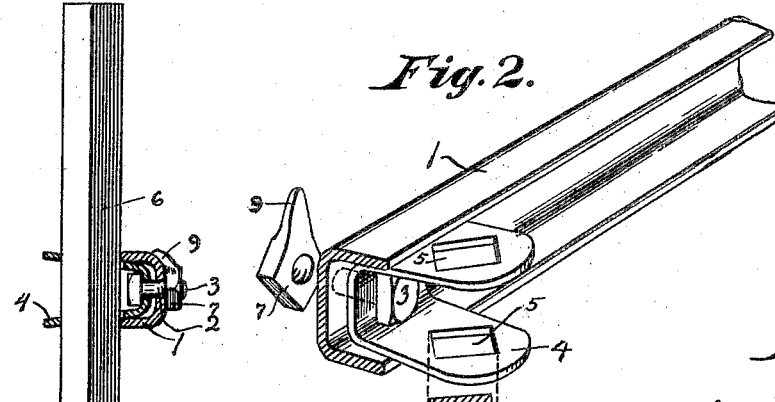
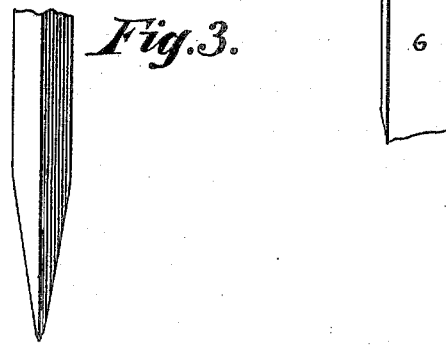
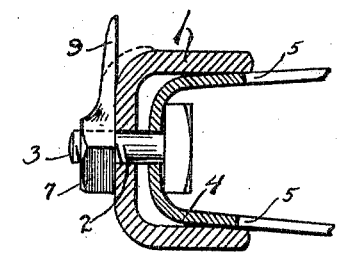
WITNESSES
Jos. J. Hosler
L. M. Bond
INVENTOR
LEMUEL E. ALLEN.
BY
F. W. Bond
ATTORNEY

UNITED STATES PATENT OFFICE.

LEMUEL E. ALLEN, OF CANTON, OHIO, ASSIGNOR TO THE BUCHER & GIBBS PLOW COMPANY, OF CANTON, OHIO, A CORPORATION OF OHIO.

HARROW-TOOTH FASTENER.

No. 817,150.     Specification of Letters Patent.     Patented April 10, 1906.

Application filed April 15, 1905. Serial No. 255,764.

*To all whom it may concern:*

Be it known that I, LEMUEL E. ALLEN, a citizen of the United States, residing at Canton, in the county of Stark and State of Ohio, have invented certain new and useful Improvements in Harrow-Tooth Fasteners; and I do hereby declare that the following is a full, clear, and exact description of the same, reference being had to the annexed drawings, making a part of this specification, and to the numerals of reference marked thereon, in which—

Figure 1 is a view showing a portion of a harrow-bar and illustrating two harrow-teeth connected thereto. Fig. 2 is a view showing a portion of a harrow-bar and illustrating the tooth-holding slip and a portion of a tooth, also showing the clip-bolt and nut. Fig. 3 is a transverse section of one of the harrow-tooth bars and tooth-holding clip, showing the tooth properly connected. Fig. 4 is a transverse section of a harrow-bar, showing the tooth-holding clip properly located.

The present invention has relation to harrow-tooth fasteners; and it consists in the novel arrangement hereinafter described, and particularly pointed out in the claims.

Similar numerals of reference indicate corresponding parts in all the figures of the drawings.

In the accompanying drawings, 1 represents a tooth-bar, which is a U-bar, and of course any desired number of bars are employed and the bars connected to a harrow-frame in any convenient and well-known manner. At the points where it is desired to locate a tooth the bars 1 are provided with apertures 2, through which apertures are located the clamping-bolts 3.

Within the grooves of the harrow-bars 1 are located the tooth-holding clips 4, which tooth-holding clips are formed U shape and each member of the clip provided with an aperture 5, which aperture is formed of a size and shape to correspond with the size of the tooth designed to be fastened, and for the purpose hereinafter described the apertures 5 are formed angular and one corner of the angular aperture located adjacent the lower and upper flanges of the U-bar 1. The clips 4 are each provided with the apertures 5, through which apertures the clamping-bolts 3 are passed. The apertures 5, formed in the clips 4, are so located that their inner corners will lie in a plane with the edges of the U-bars 1, or substantially so, and when in said position the clips will be spaced a short distance from the inner face of the U-bar 1. The object of so locating the apertures 5 is to provide a means for adjusting the clips 4 by means of the clamping-bolt 3 and the nut 7, as it will be understood that when the nut 7 is rotated in one direction the head of the bolt 3 will draw the clip 4 toward the inner face of the channel-bar 1, thereby bringing portions of the apertures 5 under and over the flanges of the channel-bar 1, by which arrangement the exposed portions of the apertures 5 are reduced.

In use the clips 4 are secured to the bars 1 and are so adjusted that the teeth 6 can be inserted through the apertures, after which the nuts 7 will rotate so as to pull the clips toward the inner face of the U-bars 1, thereby securely clamping the teeth between the edges of the U-bars and the outer corners of the apertures 5, and for the purpose of preventing any loosening of the clamping-bolts after the teeth have been properly clamped or secured the nuts 7 are provided with the bendable tangs 9, which bendable tangs are bent over and upon the convexed face of the channel-bars 1, thereby preventing any rotation of the nuts, but at the same time providing a means for releasing the nuts when it is desired to remove the teeth or adjust the same for any purpose by simply bending the bendable tangs, so as to allow the nuts 7 to be rotated. It will be understood that by forming the apertures 5 so that one corner of each aperture lies adjacent the flanges of the U-bar and by forming the teeth angular the corners of the teeth will come in contact with the edges of the U-bars and in a sense become seated in such a manner that the teeth will not move endwise or be liable to do so, owing to the fact that the dull-edged corners are brought snugly against the harrow-bars 1.

The tooth-clip 4 is preferably formed of sheet-steel for the purpose of reducing the cost of manufacture and at the same time producing a clip well adapted for the purpose designed.

For the purpose of temporarily holding the teeth to the clips before the teeth are clamped to the U-bar the members of the clip diverge with respect to each other, so that said members are located at a slight angle other than a right angle to the teeth, and thereby frictionally hold the teeth and clips in relative position with reference to each other prior to engagement against the U-bar, after which the teeth will become firmly clamped to the bars, as above described.

Having fully described my invention, what I claim as new, and desire to secure by Letters Patent, is—

1. In a harrow-tooth fastener, the combination of a U-bar, a clip consisting of yielding diverging members, the inner end of the clip proper adapted to be located in the channel of the U-bar, and the diverging members provided with tooth-apertures, said apertures arranged to be partially closed by the members of the U-shaped bar, and the clip adjustably attached to the U-bar, and means for holding the clip in fixed adjustment, substantially as and for the purpose specified.

2. In a harrow-tooth fastener, the combination of a U-bar, clips consisting of yielding diverging members, and the diverging members provided with angled apertures and one angle of each aperture of the clips located adjacent the edges of the U-bar and the clips located in the channel of the U-bar and adjustable with reference to said U-bar and means for holding the clips in fixed adjustment, and teeth located through the apertures of the clip members, and one corner of each tooth located against the edges of the U-bar and the opposite corner of each tooth located against the angled faces of the aperture, substantially as and for the purpose specified.

In testimony that I claim the above I have hereunto subscribed my name in the presence of two witnesses.

LEMUEL E. ALLEN.

Witnesses:
J. A. JEFFERS,
F. W. BOND.